United States Patent
Chang

(10) Patent No.: US 8,704,774 B2
(45) Date of Patent: Apr. 22, 2014

(54) METHOD FOR CONTROLLING PARTIAL LOCK IN PORTABLE DEVICE HAVING TOUCH INPUT UNIT

(75) Inventor: Jae Seung Chang, Seoul (KR)

(73) Assignee: Samsung Electronics Co., Ltd. (KR)

(*) Notice: Subject to any disclaimer, the term of this patent is extended or adjusted under 35 U.S.C. 154(b) by 1596 days.

(21) Appl. No.: 11/837,270

(22) Filed: Aug. 10, 2007

(65) Prior Publication Data

US 2008/0055276 A1   Mar. 6, 2008

(30) Foreign Application Priority Data

Sep. 1, 2006   (KR) .................. 10-2006-0084346

(51) Int. Cl.
*G06F 3/041*   (2006.01)

(52) U.S. Cl.
USPC ........................................... 345/173

(58) Field of Classification Search
USPC ................................. 345/156–184
See application file for complete search history.

(56) References Cited

U.S. PATENT DOCUMENTS

| | | | |
|---|---|---|---|
| 6,985,137 B2* | 1/2006 | Kaikuranta | 345/175 |
| 2005/0079896 A1* | 4/2005 | Kokko et al. | 455/566 |
| 2005/0116840 A1* | 6/2005 | Simelius | 341/22 |
| 2006/0012577 A1* | 1/2006 | Kyrola | 345/173 |
| 2007/0135091 A1* | 6/2007 | Wassingbo | 455/410 |
| 2007/0150826 A1* | 6/2007 | Anzures et al. | 715/772 |
| 2008/0290985 A1* | 11/2008 | Vogedes et al. | 340/3.1 |

FOREIGN PATENT DOCUMENTS

| KR | 1020020064408 | 8/2002 |
|---|---|---|
| KR | 1020030013907 | 2/2003 |

* cited by examiner

*Primary Examiner* — Jimmy H Nguyen
(74) *Attorney, Agent, or Firm* — The Farrell Law Firm, P.C.

(57) ABSTRACT

A control method for providing a partial lock function in a portable device having a touch input unit and a lock key is provided. The control method includes entering a first lock state; determining whether an input of the lock key is received; determining, if an input of the lock key is received, which one of a second lock state and a third lock state is selected; and setting a lock state of the portable device to the selected lock state. Each of the first, second and third lock states is different from the other two lock states and is one of an entire lock state, a partial lock state and an entire unlock state. The input means may be a touchpad, a touchscreen and an optical jog, and at least one input manner is a touch or a sweep. The partial lock state may be a state in which a lock and an unlock function are provided according to the types or input manners of the touch input unit.

7 Claims, 7 Drawing Sheets

METHOD FOR CONTROLLING PARTIAL LOCK IN PORTABLE DEVICE HAVING TOUCH INPUT UNIT

PRIORITY

This application claims priority under 35 U.S.C. §119 to an application entitled "METHOD FOR CONTROLLING PARTIAL LOCK IN PORTABLE DEVICE HAVING TOUCH INPUT UNIT" filed in the Korean Intellectual Property Office on Sep. 1, 2006 and assigned Serial No. 2006-0084346, the contents of which are incorporated herein by reference.

BACKGROUND OF THE INVENTION

1. Field of the Invention

The present invention relates to a portable device having a touch input unit, and in particular, to a control method for providing a partial lock function in a portable device having a touch input unit according to types or touch input manners of the touch input unit to reduce malfunction and improve usability of the portable device.

2. Description of the Related Art

With the remarkable development of communication techniques and semiconductor techniques, a variety of new portable devices has been developed for convenient and comfortable use. The portable devices include mobile phones, Personal Digital Assistants (PDAS) and MP3 players.

Currently, an increasing number of portable devices use a touchpad, a touchscreen or an optical jog as input means. The input means include various types of hardware, but have a common feature in that an input function is performed by contact of a finger of a user. Thus, the input means are referred to as "a touch input device."

The touch input device performs an input function by touch and sweep motions of a user's finger, compared with a typical button input unit operated by recognition of a push motion by a user's finger. Such a touch input manner determines even a light touch of the body or of another object to be an operation intention of a user and performs a touch input function. Thus, although the touch input manner may be regarded as an intuitional and convenient input manner, in practice it causes frequent malfunction.

In order to prevent malfunction, techniques using a lock function have been introduced. A conventional technique uses a lock key operated in the same manner as a button input unit to provide lock/unlock functions to a touch input unit. However, in the case that the touch input unit has at least two types of input means (for example, a touchpad and a touchscreen) or an input manner of touch and sweep, the conventional technique may result in an inconvenient lock function.

For example, in the case that a portable device having a touchpad and a touchscreen is put in a pocket or a bag, the touchpad may respond to static electricity, thereby causing malfunction of the portable device. In order to prevent this problem, a state of the entire device may be changed to a lock state, which makes it ineffective. When a communication device such as a mobile phone is in a lock state, the communication device may not rapidly and effectively respond to an emergency situation. Further, malfunction is sufficiently prevented only by lock of a touch manner, but the whole input manner may be locked, thereby causing inconvenience.

Another conventional technique reduces the sensitivity of a touch input unit in order not to respond to external shocks to some extent. However, such a technique reduces usability of a portable device.

SUMMARY OF THE INVENTION

The present invention provides a lock function in a portable device having two types of input means according to the types of the input means, thereby preventing malfunction and improving usability of the portable device.

The present invention further provides a lock function in a portable device having a touch input manner including touch and sweep according to the touch input manners, thereby preventing malfunction and improving usability of the portable device.

According to an exemplary embodiment of the present invention, a method for controlling a partial lock in a portable device having a touch input unit and a lock key includes entering a first lock state; determining whether an input of the lock key is received; determining, if an input of the lock key is received, which of a second lock state and a third lock state is selected; and setting a lock state of the portable device to the lock state selected from the second lock state and the third lock state, wherein each of the first lock state, the second lock state and the third lock state is different from the other lock states and is any one of an entire lock state, a partial lock state and an entire unlock state.

In the method for controlling a partial lock according to the present invention, the touch input unit may have at least two types of input means, and the partial lock state may be a state in which a lock function and an unlock function are provided according to the types of the input means. Further, the touch input unit may have at least two input manners, and the partial lock state may be a state in which a lock function and an unlock function are provided according to the input manners of the touch input unit. At least one of the types of the input means may be one of a touchpad, a touchscreen, and an optical jog, and at least one input manner of the touch input unit may be one of a touch and a sweep.

Further, entering the first lock state may be performed at the time of recognizing operation of the portable device, wherein the first lock state may be a partial lock state.

According to an exemplary embodiment of the present invention, a method for controlling a partial lock in a portable device having a touch input unit and a lock key includes determining, if an input of the lock key is received, which one of an entire lock state, a partial lock state and an unlock state, is the current lock state; determining, if the lock key input is for a lock state other than the current lock state, which lock state is selected; and changing the lock state of the portable device from the current lock state to the selected lock state.

BRIEF DESCRIPTION OF THE DRAWINGS

The aspects, features and advantages of the present invention will become more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Figure 1:
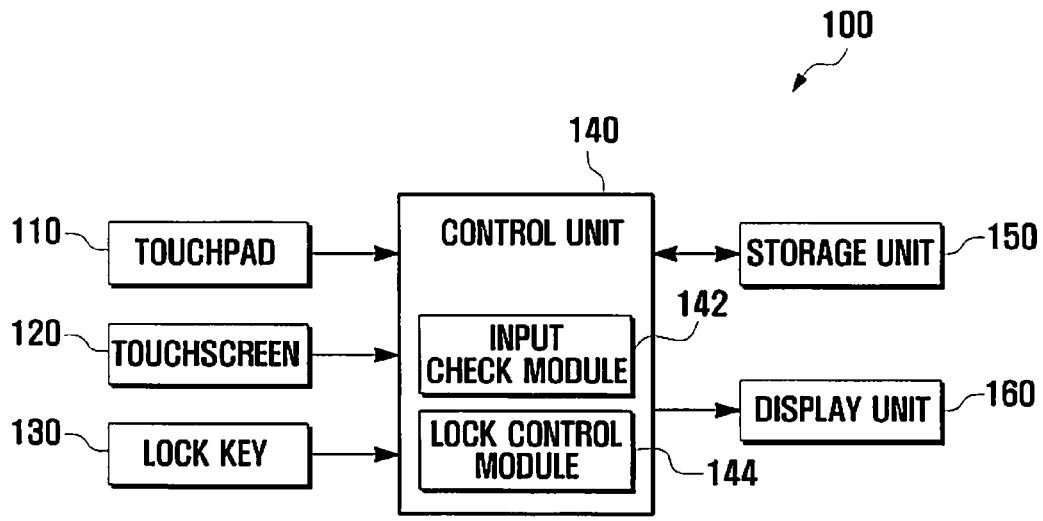
FIG. 1 is a block diagram illustrating a configuration of a portable device, in which a method for controlling a partial lock according to the present invention is implemented.

FIG. 1 is a block diagram illustrating a main configuration of a portable device, in which a method for controlling a partial lock according to the present invention is implemented.

Referring to FIG. 1, the portable device 100 includes a touchpad 110, a touchscreen 120, a lock key 130, a control unit 140, a storage unit 150, and a display unit 160. In particular, the control unit 140 includes an input check module 142 and a lock control module 144.

The touchpad 110 and the touchscreen 120 form a touch input unit of the portable device 100. Alternatively, the portable device 100 may have a single type touch input unit. The touch input unit including the touchpad 110 and the touch screen 120 senses input (hereinafter 'touch input') by a touch motion of a user. A touch input manner may be a touch and a sweep, and generally touch input uses these two touch input manners, but in some instances may use only one touch input manner, or may use other touch input manners.

The lock key 130 senses a push motion of a user in the same manner as a typical button input unit. The lock key 130 is used by a user to change a lock state of the portable device 100.

The control unit 140 controls the whole operation of the portable device 100. That is, the control unit 140 controls operation of components and interaction between the components of the portable device 100.

In particular, the input check module 142 determines whether a touch input is received from the touchpad 110 and the touchscreen 120; whether, in the case that a touch input is received, an input of the lock key 130 is received; which manner of touch input is received from which of the touchpad 110 and the touchscreen 120; and whether a lock state is selected. In the case that a touch input is received, the lock control module 144 determines the current lock state, controls to lock or perform a corresponding function accordingly, and in the case that a lock state is selected, sets to the selected lock state.

The storage unit 150 stores the current lock state, and a user interface indicating the current lock state and a selection list of lock state.

The display unit 160 displays the current lock state and the selection list of lock state using the user interface stored in the storage unit 150 by control of the lock control module 144.

Hereinafter, a method for controlling a partial lock in a portable device having a touch input unit according to the present invention is described through exemplary embodiments in detail.

FIGS. 2A to 2D are flow charts of a method for controlling a partial lock in a portable device according to an exemplary embodiment of the present invention, and FIGS. 3A to 3F are examples of display screen illustrating application of the method illustrated in FIGS. 2A to 2D.

Figure 2A:
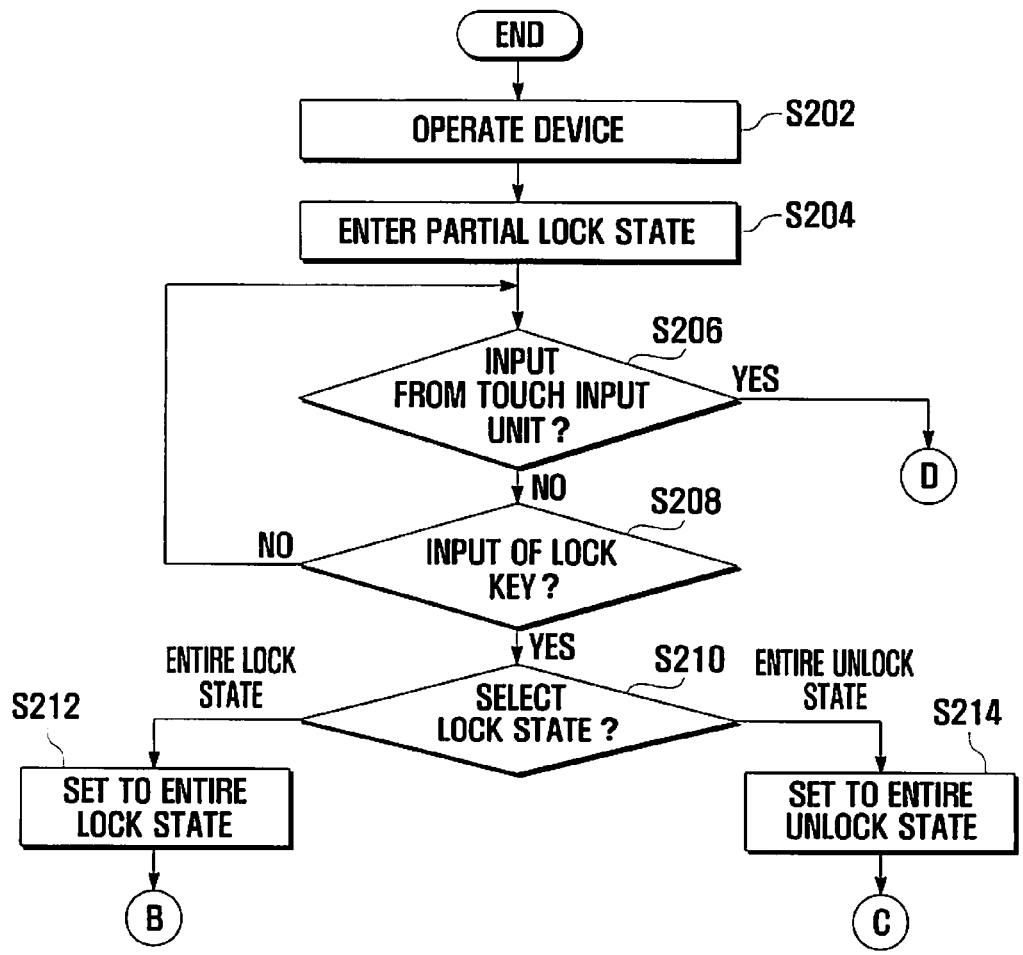
FIGS. 2A to 2D are flow charts of a method for controlling a partial lock in a portable device according to an exemplary embodiment of the present invention.
Figure 3A:
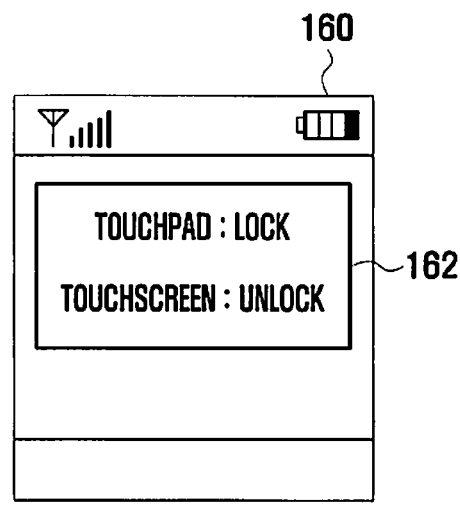
FIGS. 3A to 3F are examples of display screens illustrating application of the method illustrated in FIGS. 2A to 2D.
Figure 3B:
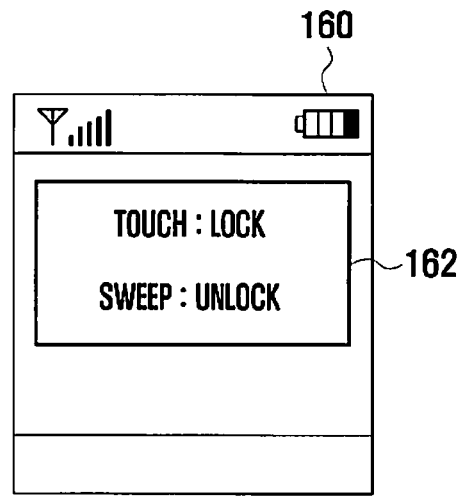

Referring to FIG. 2A, the control unit 140 recognizes operation of the portable device 100 in step S202, and enters a partial lock state in step S204. As such, the method of the present invention may automatically set to a partial lock state whenever the device operates. The partial lock state is a state in which lock and unlock functions are provided according to types or touch input manners of the touch input unit. As shown in FIGS. 3A and 3B, at the time of entering the partial lock state, the display unit 160 outputs a pop-up window 162 notifying of the partial lock state.

FIG. 3A is a display screen example illustrating a partial lock state according to types of the touch input unit, and FIG. 3B is a display screen example illustrating a partial lock state according to touch input manners. A lock function may be provided only to the touchpad 110, or only to the touchscreen 120, as shown in FIG. 3A. In the same manner, a lock function may be provided only to a touch manner, or only to a sweep manner, as shown in FIG. 3B. The partial lock state may be preset in the portable device 100 according to types or characteristics of the portable device 100, or may be set by the user.

Figure 3C:
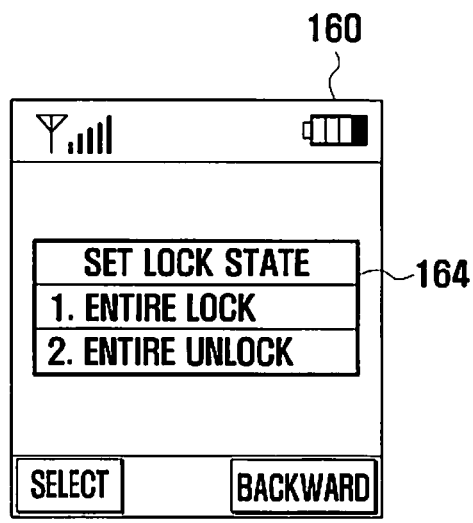

After entering the partial lock state, the input check module 142 determines whether a touch input is received from the touch input unit in step S206. If a touch input is not received, the input check module 142 determines whether an input of the lock key 130 is received in step S208. If an input of the lock key 130 is received, the input check module 142 determines whether a lock state is selected in step S210. At this time, the lock control module 144 outputs a pop-up window 164 for selecting the lock state to the display unit 160, as shown in FIG. 3C.

Figure 3D:
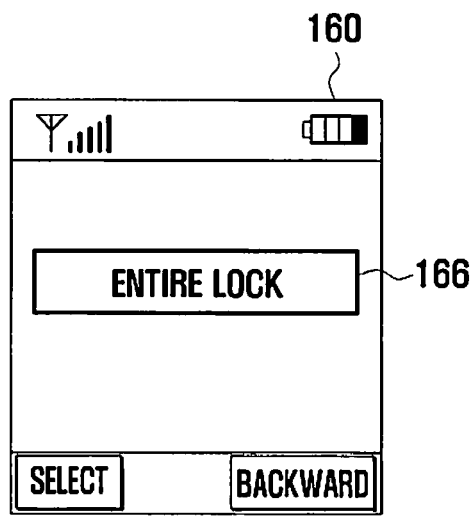

Because the current lock state is the partial lock state, the states available for selection are the entire lock state and the entire unlock state. The input check module 142 receives a selection input of the user, and the lock control module 144 sets the lock state to the entire lock state in step S212 or to the entire unlock state in step S214 according to the user selection input. At this time, the lock control module 144 outputs a pop-up window 166 notifying of the set lock state to the display unit 160, as shown in FIG. 3D.

Figure 2B:
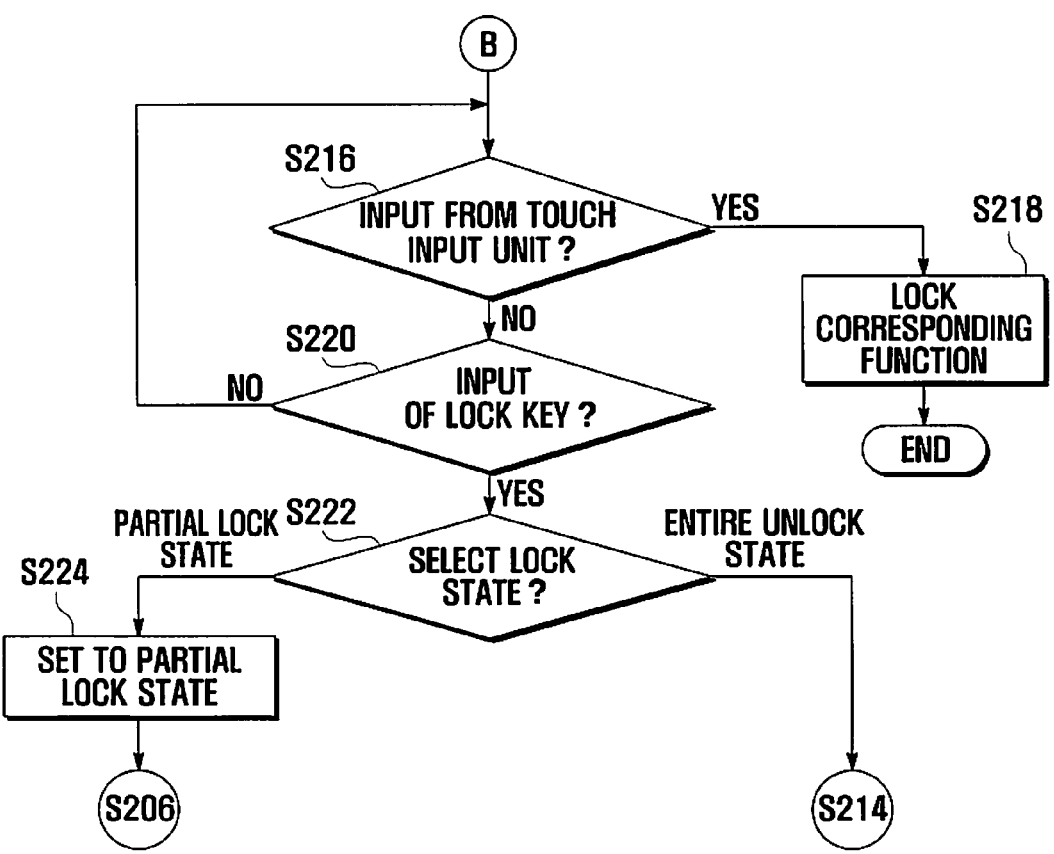
Figure 2C:
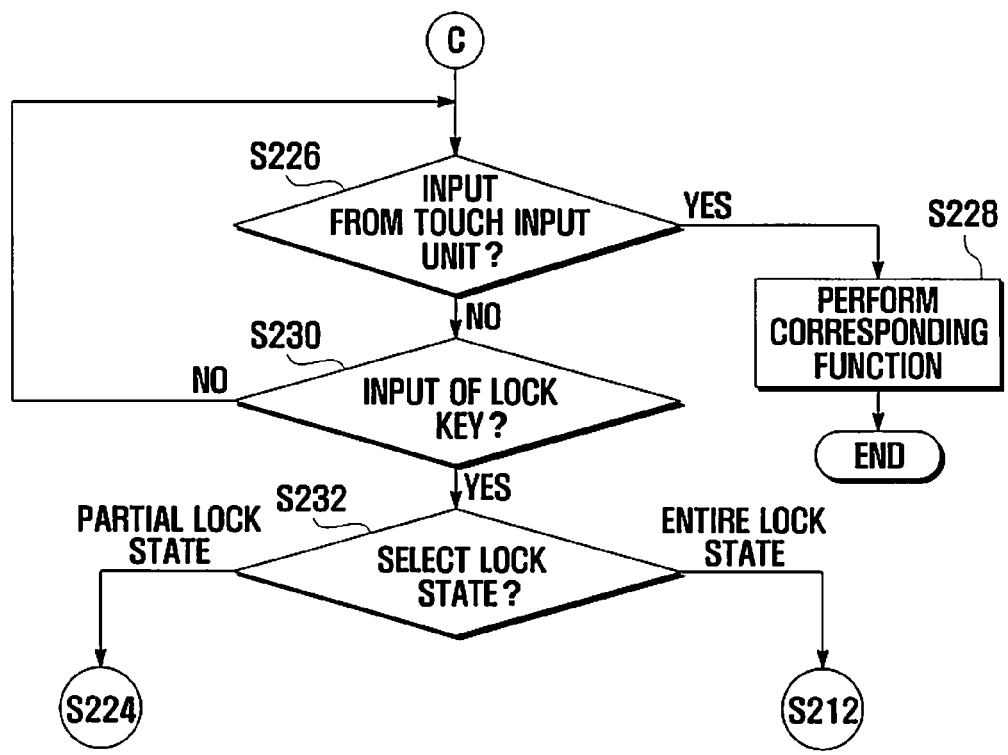
Figure 2D:
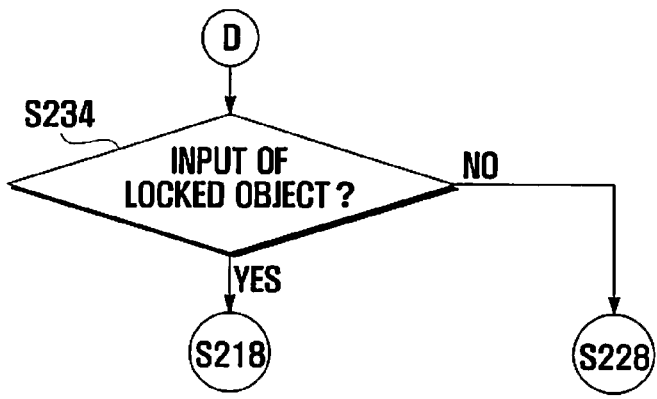

FIG. 2B shows subsequent steps in the case that the entire lock state is set at step S212, and FIG. 2C shows subsequent steps in the case that the entire unlock state is set at step S214. FIG. 2D shows a subsequent step in the case that a touch input is received at step S206 for determining a touch input.

Referring to FIG. 2B, if the entire lock state is set at step S212, the input check module 142 determines whether a touch input is received from the touch input unit in step S216. If a touch input is received, the lock control module 144 locks a corresponding function, as the current lock state is the entire lock state in step S218. That is, even if a touch input such as a touch or a sweep is received, the lock control module 144 does not perform a corresponding function.

If a touch input is not received at step S216, the input check module 142 determines whether an input of the lock key 130 is received in step S220. If an input of the lock key 130 is received, the input check module 142 determines whether a lock state is selected in step S222. At this time, the lock control module 144 outputs a pop-up window 168 for selecting a lock state to the display unit 160, as shown in FIGS. 3E and 3F.

Figure 3E:
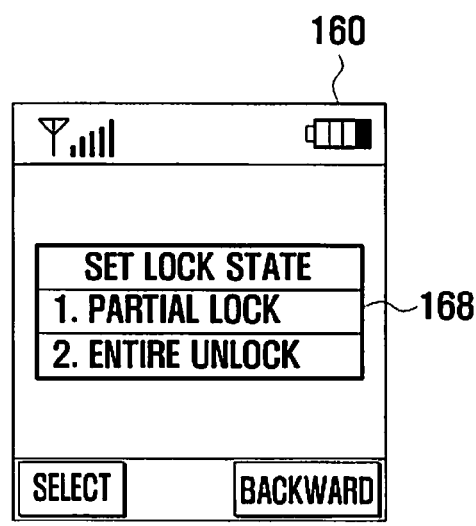
Figure 3F:
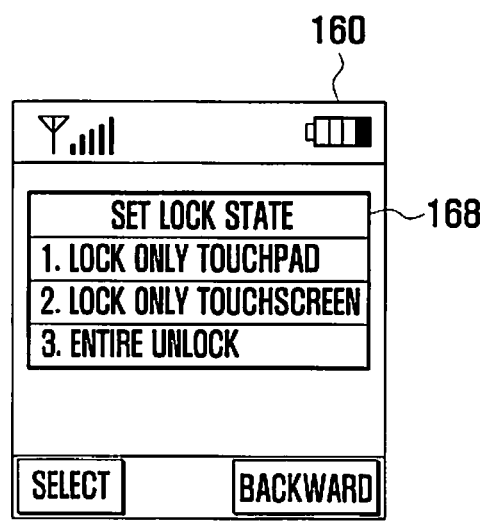

FIG. 3E shows an embodiment in which, if the user selects the partial lock function, a preset lock function may be enabled to provide only a specific type of input means (or a specific manner of touch input). FIG. 3F shows another embodiment in which the user can select to provide a lock function to a specific type of input means (or a specific manner of touch input).

Because the current lock state is the entire lock state, the states available for selection are the partial lock state and the entire unlock state. The input check module 142 receives a selection input of the user, and the lock control module 144 sets the lock state to the partial state in step S224, or to the entire unlock state in step S214, according to the user selection input. If the lock state is set to the partial lock state in step S224, the process returns to step S206.

Referring to FIG. 2C, if the lock state is set to the entire unlock state in step S214, the input check module 142 determines whether a touch input is received from the touch input unit in step S226. If a touch input is received, the lock control module 144 performs a corresponding function, as the current lock state is the entire unlock state in step S228. That is, if a touch input such as a touch or a sweep is received, the lock control module 144 performs a corresponding function.

If a touch input is not received at step S226, the input check module 142 determines whether an input of the lock key 130 is received in step S230. If an input of the lock key 130 is received, the input check module 142 determines whether a lock state is selected in step S232. At this time, the lock control module 144 outputs a pop-up window similar to the pop-up window 168 shown in FIG. 3E or to that shown in FIG. 3F to the display unit 160.

Because the current lock state is the entire unlock state, the states available for selection are the partial lock state and the entire lock state. The input check module 142 receives a selection input of the user, and the lock control module 144 sets the lock state to the partial lock state at step S224, or to the entire lock state at step S212, according to the user selection input.

Referring to FIG. 2D, if a touch input is received at step S206 of determining a touch input, i.e. in the case that a touch input is received in the partial lock state, the input check module 142 determines whether the received touch input is an input of a locked object in step S234.

For example, in the case that the current lock state is set to lock the touchpad 110 and to unlock the touchscreen 120, the input check module 142 determines whether the received touch input is an input of the locked touchpad or of the unlocked touchscreen 120. Alternatively, in the case that the current lock state is set to lock a touch manner and to unlock a sweep manner, the input check module 142 determines whether the received touch input is a locked touch manner or an unlocked sweep manner. In the former case, the touchpad 110 and the touchscreen 120 have different input receiving channels, and thus the input object of the received touch input can be easily distinguished, and in the latter case, the input manner of the received touch input can be distinguished according to whether a start point of the touch input is identical to an end point of the touch input. A touch is performed at one point, and thus a start point of the touch input is identical to an end point of the touch input, whereas sweep is generated by sliding of a finger of a user, and thus a start point of the touch input is not identical to an end point of the touch input.

If the received touch input is an input of a locked object at step S234, the lock control module 144 locks a corresponding function at step S218, and if the received touch input is not an input of a locked object, the lock control module 144 performs a corresponding function in step S228.

Figure 4:
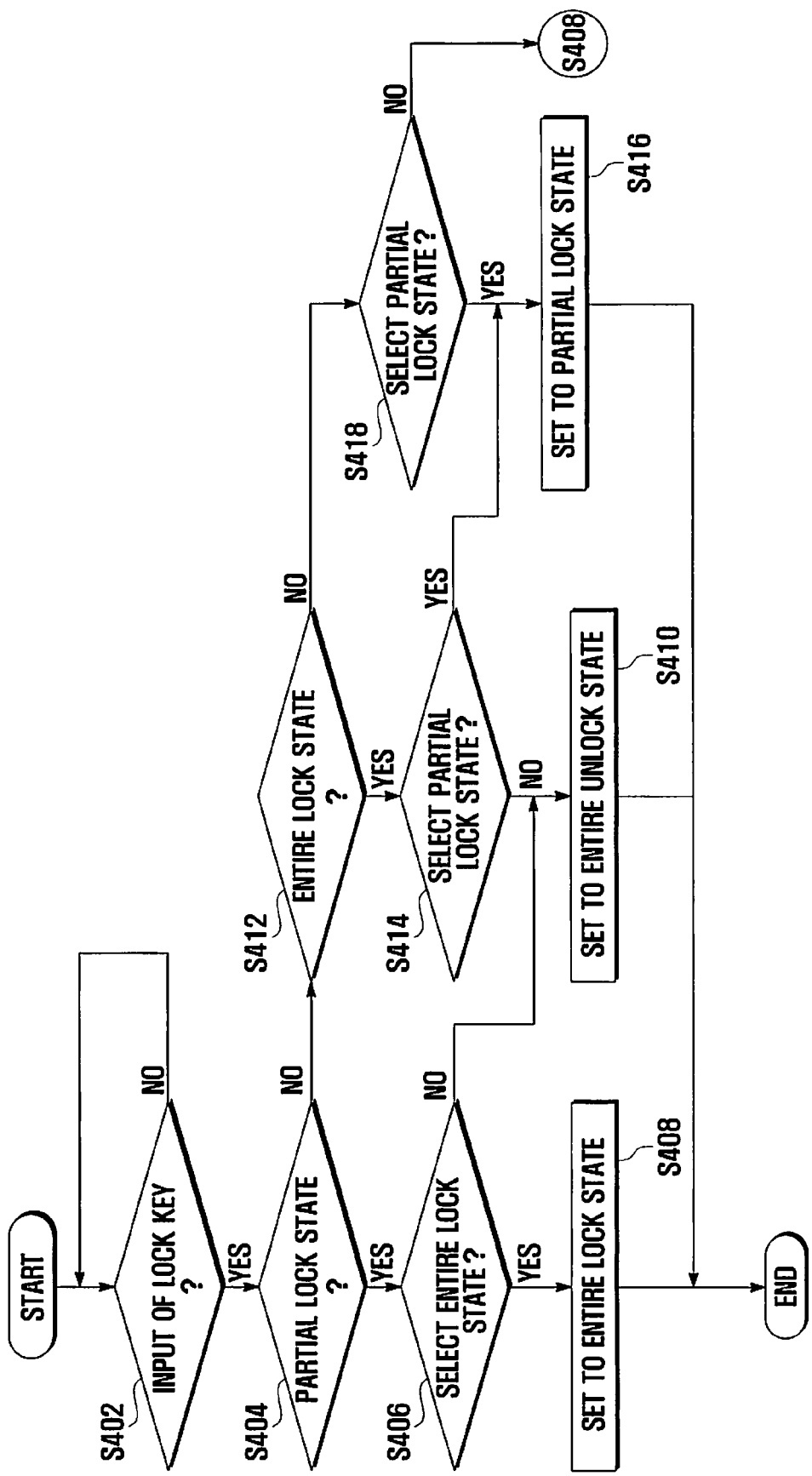
FIG. 4 is a flowchart of a method for controlling a partial lock in a portable device according to another exemplary embodiment of the present invention.

FIG. 4 is a flowchart of a method for controlling a partial lock in a portable device according to another exemplary embodiment of the present invention.

In the previously described exemplary embodiment, a partial lock state is automatically set whenever a potable device operates. However, the present exemplary embodiment may be applied regardless of a lock state that exists when a portable device operates. In this case, a lock state existing at the time the portable device turns off may be memorized and the same lock state may be automatically reset when the portable device operates again.

Referring to FIG. 4, first, the input check module 142 determines whether an input of the lock key 130 is received in step S402. If an input of the lock key 130 is received, the lock control module 144 determines whether a current lock state is a partial lock state in step S404. If a current lock state is a partial lock state, the input check module 142 determines whether an entire lock state is selected in step S406. If an entire lock state is selected, the lock control module 144 sets the lock state of the portable device 100 to the entire lock state in step S408. If an entire lock state is not selected at step S406, the lock control module 144 sets the lock state of the portable device 100 to an entire unlock state in step S410.

If a current lock state is not a partial lock in step S404, the lock control module 144 determines whether the current lock state is the entire lock state in step S412. If the current lock state is the entire lock state, the input check module 142 determines whether the partial lock state is selected in step S414. If the partial lock state is not selected, the lock control module 144 sets the lock state of the portable device 100 to the entire unlock state in step S410. If the partial lock state is selected, the lock control module 144 sets the lock state of the portable device 110 to the partial lock state in step S416.

If the current lock state is not the entire lock state at step S412, the lock control module 144 determines that the current lock state is the entire unlock state. Next, the input check module 142 determines whether the partial lock state is selected in step S418. If the partial lock state is selected, the lock control module 144 sets the lock state of the portable device 100 to the partial lock state in step S416. If the partial lock state is not selected, the lock control module 144 sets the lock state of the portable device 100 to the entire lock state in step S408.

In the present exemplary embodiment, the method for controlling a partial lock focuses on which state a lock state is set (or changed) to, at the time an input of the lock key is received. If a touch input is received from the touch input unit, a subsequent step may be performed according to the previous exemplary embodiment.

In the described exemplary embodiments, lock and unlock functions are provided according to a type of a touch input unit or according to a touch input manner. However, the lock and unlock functions may also be provided according to combinations of a type of a touch input unit and a touch input manner.

The method for controlling a partial lock according to the present invention may be applied to a variety of portable devices having at least one touch input unit, for example a mobile phone, PDA, MP3 player, PMP, DMB receiver and navigation terminal.

The present invention suggests a concept of a partial lock in a portable device having a touch input unit. That is, the present invention provides a control method for partially providing lock and unlock functions to a single portable device. The method for controlling a partial lock may be applied to any cases in which a touch input unit of the portable device includes two types of hardware and at least two input manners exist in the same input hardware. Therefore, the present invention controls the portable device to effectively prevent malfunction and improve usability of the portable device.

Although exemplary embodiments of the present invention have been described in detail hereinabove, it should be understood that many variations and modifications of the basic inventive concept herein described, which may appear to those skilled in the art, will still fall within the spirit and scope of the present invention as defined in the appended claims.

What is claimed is:

1. A method for controlling a partial lock in a portable device having a touch input unit and a lock key, the method comprising:
   entering a first lock state;
   determining whether an input of the lock key is received;
   determining, when an input of the lock key is received, which of a second lock state and a third lock state is selected; and
   setting a lock state of the portable device to the selected lock state,
   wherein each of the first lock state, the second lock state, and the third lock state is different from other lock states and is one of an entire lock state, a partial lock state, and an entire unlock state,
   wherein the touch input unit has a first input means and a second input means, and one of the first input means and the second input means is a touchpad and the other of the first input means and the second input means is one of a touchscreen and an optical jog,
   wherein the entire lock state is a first state in which a lock function is provided to the first input means and the second input means,
   wherein the partial lock state is a second state in which the lock function is provided to one of the first input means and the second input means and an unlock function is provided to another of the first input means and the second input means, and
   wherein the entire unlock state is a state in which the unlock function is provided to the first input means and the second input means.

2. The method for controlling a partial lock of claim 1, wherein entering the first lock state is performed at an initial time of recognizing operation of the portable device.

3. The method for controlling a partial lock of claim 2, wherein the first lock state is the partial lock state.

4. The method for controlling a partial lock of claim 1, further comprising:
   determining, before determining whether an input of the lock key is received, whether a touch input is received from the touch input unit,
   wherein, when a touch input is not received, determining whether an input of the lock key is received.

5. The method for controlling a partial lock of claim 4, further comprising:
   determining, when the first lock state is the partial lock state and the touch input is received, whether the received touch input is an input of a locked object;
   locking, when the received touch input is the input of a locked object, a function corresponding to the received touch input; and
   performing, when the received touch input is not the input of a locked object, a function corresponding to the received touch input.

6. The method for controlling a partial lock of claim 4, further comprising:
   locking, when the first lock state is the entire lock state and the touch input is received, a function corresponding to the received touch input.

7. The method for controlling a partial lock of claim 4, further comprising:
   performing, when the first lock state is the entire unlock state and the touch input is received, a function corresponding to the received touch input.

* * * * *